(12) United States Patent
Shiraishi et al.

(10) Patent No.: US 11,433,603 B2
(45) Date of Patent: Sep. 6, 2022

(54) POWDER MATERIAL, METHOD FOR MANUFACTURING THREE-DIMENSIONAL MODELED OBJECT, AND THREE-DIMENSIONAL-MODELING DEVICE

(71) Applicant: KONICA MINOLTA, INC., Tokyo (JP)

(72) Inventors: Masaharu Shiraishi, Kanagawa (JP); Kazuya Isobe, Tokyo (JP); Akiko Hara, Tokyo (JP); Kazufumi Yamazaki, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 1135 days.

(21) Appl. No.: 15/779,710

(22) PCT Filed: Oct. 4, 2016

(86) PCT No.: PCT/JP2016/079384
§ 371 (c)(1),
(2) Date: May 29, 2018

(87) PCT Pub. No.: WO2017/094345
PCT Pub. Date: Jun. 8, 2017

(65) Prior Publication Data
US 2020/0298473 A1    Sep. 24, 2020

(30) Foreign Application Priority Data
Nov. 30, 2015 (JP) .............................. JP2015-233081

(51) Int. Cl.
*B29C 64/153* (2017.01)
*B33Y 50/02* (2015.01)
(Continued)

(52) U.S. Cl.
CPC .......... *B29C 64/153* (2017.08); *B29C 64/393* (2017.08); *B33Y 10/00* (2014.12);
(Continued)

(58) Field of Classification Search
CPC ..... B29C 64/153; B29C 64/393; C08L 23/06; C08L 23/12; C08L 67/02
See application file for complete search history.

(56) References Cited

U.S. PATENT DOCUMENTS

| 8,906,588 B2 | 12/2014 | Shinya et al. | |
| 2005/0263933 A1* | 12/2005 | Welch, IV | B33Y 30/00 264/113 |

(Continued)

FOREIGN PATENT DOCUMENTS

| JP | H04182665 A | 6/1992 |
| JP | 2005533877 A | 11/2005 |

(Continued)

OTHER PUBLICATIONS

Extended European Search Report corresponding to Application No. 16870285.0-1019/3385060 PCT/JP2016079384; dated Nov. 22, 2018.

(Continued)

*Primary Examiner* — Michael M. Robinson
(74) *Attorney, Agent, or Firm* — Cantor Colburn LLP

(57) ABSTRACT

The present invention pertains to a powder material used to manufacture a three-dimensional modeled object by selectively radiating laser light to a thin layer of the powder material including powder particles, forming a modeled object layer obtained by melt-binding of the powder particles, and layering the modeled object layer. The powder particles include a core resin and a shell resin for coating the core resin, the temperature at which the storage modulus G' of the material constituting the shell resin is $1 \times 10^{6.5}$ Pa being (Continued)

higher than the temperature at which the storage modulus G' of the material constituting the core resin is $1 \times 10^{6.5}$ Pa. The abovementioned powder material, makes it possible to manufacture a three-dimensional modeled object having higher definition.

9 Claims, 3 Drawing Sheets

(51) Int. Cl.
    *B29C 64/393*     (2017.01)
    *C08L 23/06*     (2006.01)
    *C08L 23/12*     (2006.01)
    *C08L 25/06*     (2006.01)
    *C08L 67/02*     (2006.01)
    *C08L 69/00*     (2006.01)
    *C08L 71/12*     (2006.01)
    *C08L 77/02*     (2006.01)
    *B33Y 10/00*     (2015.01)
    *B33Y 30/00*     (2015.01)
    *B33Y 70/00*     (2020.01)
(52) U.S. Cl.
    CPC ............... *B33Y 30/00* (2014.12); *B33Y 50/02* (2014.12); *B33Y 70/00* (2014.12); *C08L 23/06* (2013.01); *C08L 23/12* (2013.01); *C08L 25/06* (2013.01); *C08L 67/02* (2013.01); *C08L 69/00* (2013.01); *C08L 71/12* (2013.01); *C08L 77/02* (2013.01); *C08L 2207/53* (2013.01)

(56) References Cited

U.S. PATENT DOCUMENTS

2007/0087281 A1     4/2007   Patel et al.
2008/0063970 A1*   3/2008   Kikawa ............ G03G 9/09314
                                                   430/110.2

FOREIGN PATENT DOCUMENTS

JP       2006321711 A     11/2006
JP       2010184412 A     8/2010

OTHER PUBLICATIONS

SIPO, The First Office Action, Reasons for Rejection, corresponding to Application No. 201680069702.2; dated Jul. 16, 2019.
International Search Report corresponding to Application No. PCT/JP2016/079384; dated Nov. 1, 2016.

* cited by examiner

POWDER MATERIAL, METHOD FOR MANUFACTURING THREE-DIMENSIONAL MODELED OBJECT, AND THREE-DIMENSIONAL-MODELING DEVICE

CROSS REFERENCE TO RELATED APPLICATIONS

This is the U.S. national stage of application No. PCT/JP2016/079384, filed on Oct. 4, 2016. Priority under 35 U.S.C. § 119(a) and 35 U.S.C. § 365(b) is claimed from Japanese Application No. 2015-233081, filed on Nov. 30, 2015, the disclosures all of which are also incorporated herein by reference.

TECHNICAL FIELD

The present invention relates to a powder material, a method of fabricating a three-dimensional object, and a three-dimensional fabrication apparatus.

BACKGROUND ART

Various methods of relatively easily fabricating complex-shaped three-dimensional objects have been developed in recent years. As one of such methods of fabricating three-dimensional objects, powder bed fusion is known. Powder bed fusion features high fabrication accuracy and high interlayer adhesion of laminated layers. Accordingly, powder bed fusion is applicable not only to creation of prototypes for confirming the shape or properties of final products, but also to fabrication of final products.

In powder bed fusion, one of finely sliced layers in the thickness direction of a three-dimensional object (hereinafter, also simply referred to as "object layer") is formed by evenly spreading a powder material containing powder particles of a resin material or a metal material to form a thin layer, and irradiating desired positions on the thin layer with a laser to selectively fuse the powder particles. On the thus-formed layer, a subsequent object layer is formed by further spreading the powder material, and irradiating the powder material with the laser to selectively fuse the powder particles. By repeating the above procedure while laminating object layers, a three-dimensional object having a desired shape is fabricated. In this process, in some cases, such a powder material is preheated before laser irradiation in order to fuse powder particles by shorter-time laser irradiation.

Patent Literature (hereinafter, abbreviated as PTL) 1 to 3 describe examples of powder materials for powder bed fusion that can improve characteristics of three-dimensional objects to be fabricated.

PTL 1 describes a powder material containing powder particles each including a core particle formed of a material containing a resin, a first coating of a polar material (polyvinylpyrrolidone or an acrylic polymer, for example) covering the core particle, and a second coating of a surfactant further covering the first coating. According to PTL 1, since a nonpolar part of the surfactant faces outward in the second coating, which is the outermost layer, the powder particles are less susceptible to agglomeration due to absorption of water from the air. Therefore, in three-dimensional fabrication using such powder particles, three-dimensional objects are to be less likely to shrink due to agglomeration of powder particles before fabrication.

PTL 2 describes a powder material containing powder particles each including a core particle of a thermoplastic resin and aggregation inhibitor particles that cover the core particle and have an average particle size of 1 μm or smaller. According to PTL 2, such powder particles exhibit high flowability, and thus powder particles before laser irradiation can be spread highly densely. Therefore, in three-dimensional fabrication using such powder particles, an object having high mechanical strength can reportedly be fabricated.

PTL 3 describes a powder material containing main powders and a laser-absorbing coloring material (carbon, for example) that can absorb a laser of a shorter wavelength than a wavelength of a laser that the main powders can absorb. According to PTL 3, the powder material enables three-dimensional fabrication using a laser of a shorter wavelength than that employed in the conventional process. Since a beam diameter of a laser can be decreased, a more highly accurate three-dimensional object can reportedly be fabricated.

CITATION LIST

Patent Literature

PTL 1
  Japanese Unexamined Patent Application Publication (Translation of PCT Application) No. 2005-533877
PTL 2
  Japanese Patent Application Laid-Open No. 2006-321711
PTL 3
  Japanese Patent Application Laid-Open No. 2010-184412

SUMMARY OF INVENTION

Technical Problem

As three-dimensional objects fabricated by powder bed fusion are applied more widely, there is a need for three-dimensional fabrication using materials different from conventional ones, especially resin materials. Such resin materials, however, have a problem in which the majority of particles tend to deform at a high temperature in the fabrication process, and thus fabrication accuracy is difficult to be enhanced. Accordingly, there is a need for a technique that enables fabrication of highly accurate three-dimensional objects by powder bed fusion using various resin materials.

The powder material described in PTL 1 can reportedly fabricate highly accurate three-dimensional objects. According to the powder material described in PTL 2, powder particles can be spread highly densely. Therefore, highly accurate three-dimensional objects are expected to be fabricated since voids are less likely to be formed in the spread powder particles and thus deformation of the powder particles is suppressed. According to the powder material of PTL 3, a short-wavelength laser beam can be employed by incorporating a laser-absorbing coloring material, such as carbon, instead of a resin as main powders, and thus a highly accurate three-dimensional object is expected to be fabricated. The studies by the present inventors, however, found that three-dimensional objects with desired accuracy were difficult to be fabricated using various types of resins even when the powder materials described in PTL 1, 2, and 3 were used.

In view of the above-mentioned problems, one object of the present invention is to provide a powder material containing powder particles formed of a resin for powder bed fusion, which is a powder material that enables fabrication of a further highly accurate three-dimensional object.

Another object of the present invention is to provide a method of fabricating a three-dimensional object using such a powder material and to provide a three-dimensional fabrication apparatus.

Solution to Problem

A first aspect of the present invention relates to the following powder material.

[1] A powder material used for fabrication of a three-dimensional object by selectively irradiating a thin layer of a powder material containing powder particles with a laser beam to form an object layer through fusing of the powder particles, and laminating the object layer, in which:

the powder particles each include a core resin and a shell resin that covers the core resin; and a temperature $TS_{(6.5)}$ at which a storage modulus G' of a material for the shell resin becomes $1 \times 10^{6.5}$ Pa is higher than a temperature $TC_{(6.5)}$ at which a storage modulus G' of a material for the core resin becomes $1 \times 10^{6.5}$ Pa.

[2] The powder material according to [1], in which a difference between the temperature $TS_{(6.5)}$ at which a storage modulus G' of a material for the shell resin becomes $1 \times 10^{6.5}$ Pa and the temperature $TC_{(6.5)}$ at which a storage modulus G' of a material for the core resin becomes $1 \times 10^{6.5}$ Pa is 5° C. or more and 70° C. or less.

[3] The powder material according to [1] or [2], in which the temperature $TC_{(6.5)}$ at which a storage modulus G' of a material for the core resin becomes $1 \times 10^{6.5}$ Pa is 50° C. or higher and 300° C. or lower.

[4] The powder material according to any one of [1] to [3], in which the temperature $TS_{(6.5)}$ at which a storage modulus G' of a material for the shell resin becomes $1 \times 10^{6.5}$ Pa is 100° C. or higher and 350° C. or lower.

[5] The powder material according to any one of [1] to [4], in which the core resin is formed of a material having a difference between a temperature $TC_{(7.0)}$ at which a storage modulus G' becomes $1 \times 10^{7.0}$ Pa and a temperature $TC_{(6.5)}$ at which a storage modulus G' becomes $1 \times 10^{6.5}$ Pa is 10° C. or more and 100° C. or less.

[6] The powder material according to any one of [1] to [5], in which an average particle size of the core resin is 1 μm or larger and 200 μm or smaller.

[7] The powder material according to any one of [1] to [6], in which an amount of the shell resin in the powder particle is 0.1 part by weight or more and 20 parts by weight or less, relative to 100 parts by weight of the core resin.

A second aspect of the present invention relates to the following method of fabricating a three-dimensional object.

[8] A method of fabricating a three-dimensional object, including:

forming a thin layer of the powder material containing the powder particles according to any one of [1] to [7];

preheating the formed thin layer of the powder material;

forming an object layer by selectively irradiating the preheated thin layer with a laser beam to fuse the powder particles contained in the powder material; and laminating a plurality of the object layers by repeating the forming of the thin layer, the preheating, and the forming of the object layer in this order a plurality of times.

[9] The method according to [8], in which in the preheating, the thin layer is heated to a temperature at which a difference between a surface temperature of the thin layer and the temperature $TC_{(6.5)}$ at which a storage modulus G' of a material for the core resin becomes $1 \times 10^{6.5}$ Pa is 5° C. or more and 50° C. or less.

[10] The method according to [8] or [9], in which in the forming of the object layer, the thin layer is selectively irradiated with the laser beam such that a storage modulus G' of a material for the core resin becomes $1 \times 10^{4.0}$ Pa or higher and $1 \times 10^{6.0}$ Pa or lower.

A third aspect of the present invention relates to the following three-dimensional fabrication apparatus.

[11] A three-dimensional fabrication apparatus including:

a build stage;

a thin layer forming section that forms, on the build stage, a thin layer of the powder material containing the powder particles according to any one of [1] to [7];

a preheating section that preheats the formed thin layer of the powder material;

a laser irradiation section that irradiates the thin layer with a laser to form an object layer through fusing of the powder particles;

a stage support section that supports the build stage such that a position of the build stage in a vertical direction is changed; and a control section that controls the thin layer forming section, the laser irradiation section, and the stage support section such that the object layer is repeatedly formed and laminated.

[12] The three-dimensional fabrication apparatus according to [11], further including a temperature measuring instrument that measures a surface temperature of the formed thin layer of the powder material, in which:

the control section receives temperature information on a region where an object layer is to be formed on a surface of the thin layer, and controls heating by the preheating section such that a difference between a temperature on the surface of the thin layer in the region where an object layer is to be formed and the temperature $TC_{(6.5)}$ at which a storage modulus G' of a material for the core resin becomes $1 \times 10^{6.5}$ Pa is 5° C. or more and 50° C. or less.

Advantageous Effects of Invention

The present invention provides a powder material containing powder particles formed of a resin for powder bed fusion, which is a powder material that enables fabrication of a further highly accurate three-dimensional object, a method of fabricating a three-dimensional object using such a powder material, and a three-dimensional fabrication apparatus.

DESCRIPTION OF EMBODIMENTS

Figure 1A:
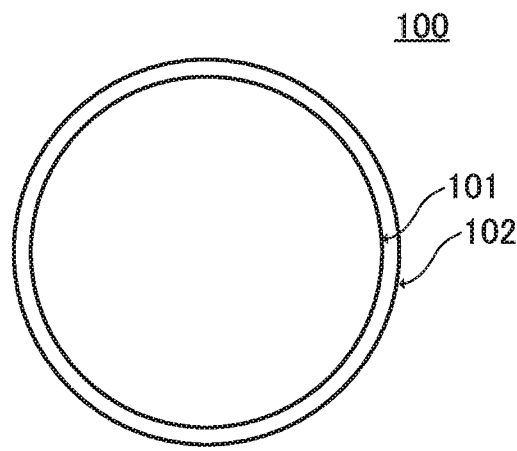
FIG. 1A is a schematic sectional view of a resin particle of an embodiment of the present invention.

To solve the above-mentioned problems, the present inventors performed extensive investigation of and experiments on powder materials for powder bed fusion. As a result, the present inventors found that a further highly accurate three-dimensional object can be fabricated by using a powder material containing powder particles having a core-shell structure, in which a temperature $TS_{(6.5)}$ at which a storage modulus G' of a material for the shell resin becomes $1\times10^{6.5}$ Pa is higher than a temperature $TC_{(6.5)}$ at which a storage modulus G' of a material for the core resin becomes $1\times10^{6.5}$ Pa, thereby making the present invention.

According to the findings newly obtained by the present inventors, when three-dimensional fabrication is performed by powder bed fusion using powder particles formed of a resin material (hereinafter, also simply referred to as "resin particles"), accuracy in three-dimensional fabrication lowers, in some cases, due to deformation of resin particles during preheating before laser irradiation.

Resin particles used for powder bed fusion have the property of softening as the temperature rises. Accordingly, when a preheating temperature is elevated, resin particles soften excessively, and thus resin particles contained in a lower layer are crushed by the weight of resin particles deposited as an upper layer, thereby causing deformation. In this process, deformation of particles particularly in the lamination direction also leads to considerable deformation of an object layer, which is formed through fusing of resin particles, in the lamination direction, thereby lowering accuracy in three-dimensional fabrication. Meanwhile, when a preheating temperature is lowered, a change in specific volume of a resin increases during heating to a fusing temperature of resin particles. Therefore, the volume of resin particles changes significantly during laser irradiation, thereby still causing deformation of resin particles.

The hardness of viscoelastic materials, such as resins, can be expressed by storage modulus G'. Resins have the property of decreasing storage modulus G' as the temperature rises. In order to suppress deformation of resin particles due to a large change in specific volume at the above-mentioned low temperature and to allow fusion of powder particles by shorter-time laser irradiation, it is preferable to set a temperature in preheating closer to a temperature at which a resin starts to soften (storage modulus G' of $1\times10^{6.5}$ Pa). At such a temperature, however, the above-described high temperature-caused deformation of resin particles slightly occurs (deformation due to softening of resin particles), and consequently accuracy in three-dimensional fabrication was unable to be enhanced to a desired level.

As a result of further investigation based on the above findings, the present inventors found that when resin particles have a core-shell structure and materials are employed so that a resin for the shell (hereinafter, also simply referred to as "shell resin") has a storage modulus G' of $1\times10^{6.5}$ Pa at a higher temperature than a resin for the core (hereinafter, also simply referred to as "core resin"), the shell resin is less susceptible to deformation even when preheated to a temperature $TC_{(6.5)}$ at which a storage modulus G' of the core resin becomes $1\times10^{6.5}$ Pa, thereby suppressing deformation of the resin particles.

The powder material of the present invention contains resin particles having the above-described characteristics (hereinafter, also simply referred to as "resin particles of the present invention"). During waiting for laser irradiation, resin particles of the present invention are preheated to around a temperature at which a storage modulus G' of a material for the core resin becomes $1\times10^{6.5}$ Pa (hereinafter, also simply referred to as "standby temperature"). Since a temperature at which a storage modulus G' of a material for the shell resin becomes $1\times10^{6.5}$ Pa is higher, a storage modulus G' of a material for the shell resin is higher than $1\times10^{6.5}$ Pa at around the standby temperature. Since resin particles of the present invention maintain hardness by outer films formed of the shell resin during the waiting, particles contained in a lower layer are presumably less susceptible to deformation due to the weight of resin particles deposited as an upper layer. Meanwhile, since resin particles are heated to around a temperature at which a storage modulus G' of a material for the core resin becomes $1\times10^{6.5}$ Pa by preheating, resin particles can be heated to a fusing temperature by less-energy irradiation, thereby enabling shorter-time three-dimensional fabrication. In addition, since the core resin is heated to the above-mentioned relatively high temperature, the specific volume of the core resin does not change much even when heated to a fusing temperature of resin particles by laser irradiation. Accordingly, deformation of the resin particles is believed to be less likely to occur due to volume changes during laser irradiation.

In PTL 1 to 3, the above-described issues arising from preheating are not fully considered. PTL 1, for example, discloses that when particles are used for 3D laser sintering, a softening temperature of a core should be satisfactorily higher than a softening temperature of an upper layer on the core. PTL 2 discloses that particles for improving sliding properties are attached to the surface of base particles in order to enhance filling properties of particles. There is, however, a problem in which softening of the base particles is difficult to be suppressed during preheating. Further, according to PTL 3, absorption of laser is enhanced by addition of carbon, for example. An issue involving preheating, i.e., aggregation of particles, however, cannot be resolved.

Hereinafter, representative embodiments of the present invention will be described in detail.

1. Powder Materials

The embodiment relates to a powder material used for fabrication of a three-dimensional object (hereinafter, also simply referred to as "powder material") by selectively irradiating a thin layer of a powder material containing powder particles with a laser beam to form an object layer through fusing of the powder particles, and laminating the object layer. The powder material contains, as the powder particles, resin particles having a core-shell structure of the present invention. The powder material may further contain materials other than the resin particles of the present invention, such as a laser absorber and a flow agent unless fusing by laser irradiation is obstructed.

1-1. Resin Particles Having Core-Shell Structure

Resin particles having a core-shell structure, as the resin particles of the present invention, include a core resin and a shell resin that covers the core resin. A temperature at which a storage modulus G' of a material for the shell resin becomes $1\times10^{6.5}$ Pa (hereinafter, this temperature will simply be denoted as $TS_{(6.5)}$ in some cases) is higher than a temperature at which a storage modulus G' of a material for the core resin becomes $1\times10^{6.5}$ Pa (hereinafter, this temperature will simply be denoted as $TC_{(6.5)}$ in some cases).

Materials for the core resin and the shell resin may be any resin provided that such a resin softens and melts by heating. Examples of the materials for the core resin and the shell resin include crystalline resins, such as polyethylene, polypropylene, a nylon, polyacetal, polyethylene terephthalate (PET), polyphenylene sulfide, a polyether ether ketone (PEEK), and a crystalline polyester; and amorphous resins, such as polystyrene, a polyurethane, polyvinyl chloride, acrylonitrile-butadiene-styrene copolymer (ABS), an acrylic polymer, a polycarbonate, ethylene-vinyl acetate copolymer (EVA), styrene-acrylonitrile copolymer (SAN), a polyarylate, a polyphenylene ether, and polycaprolactone.

Amorphous resins, among the above resins, are difficult to enhance fabrication accuracy by conventional methods.

According to the resin particles having a core-shell structure of the embodiment, however, fabrication accuracy can be enhanced further. In view of the above, a material for the core resin is preferably an amorphous resin.

A temperature $TS_{(6.5)}$ at which a storage modulus G' of a material for the shell resin becomes $1 \times 10^{6.5}$ Pa is higher than a temperature $TC_{(6.5)}$ at which a storage modulus G' of a material for the core resin becomes $1 \times 10^{6.5}$ Pa. Such temperatures at which a storage modulus G' becomes $1 \times 10^{6.5}$ Pa and a temperature at which a storage modulus G' becomes each value mentioned hereinafter may be values obtained/measured according to a commonly known method. The above-mentioned storage modulus G' is a value obtained/measured according to the following method using a storage modulus measuring apparatus (from TA Instruments, ARES-G2 rheometer).

(Preparation of Samples)

A core resin or a shell resin of resin particles is separated and extracted using a solvent that only dissolves either the core resin or the shell resin, and dried as powders. The resulting powders are pressed at ambient temperature and at 30 kN for 1 minute using a press (from NPa System Co., Ltd., NT-100H) to yield a columnar sample with a diameter of about 8 mm and a height of about 2 mm.

(Measurement Procedure)

The prepared columnar sample is heat-melted and then attached to parallel plates of the press, whose temperatures have been adjusted to 150° C., under load in the vertical direction without exceeding axial force of 10 gw. Under this state, the parallel plates and the columnar sample are heated to a measurement start temperature of 250° C., and viscoelasticity data is measured while the parallel plates and the columnar sample are cooled gradually. The measured data is forwarded to a computer on which Windows 7 (from Microsoft Corporation, "Windows" is a registered trade mark of the firm) is installed, and a storage modulus G' (Pa) value at each temperature is read through control, data collection, and analysis software (TRIOS) that operates on the computer.

(Measurement Conditions)

Measurement frequency: 6.28 rad/s

Setting of measurement strain: set to initial value of 0.1% and measured in an automatic measurement mode Elongation correction of sample: adjusted in an automatic measurement mode Measurement temperature: gradual cooling from 250° C. to 100° C. at 5° C./min Measurement interval: viscoelasticity data measured every 1° C.

The powder material containing resin particles having a core-shell structure of the embodiment exhibits higher fabrication accuracy than conventional powder materials when preheated to around a temperature at which a storage modulus G' of a material for the core resin becomes $1 \times 10^{6.5}$ Pa. Since a storage modulus G' of a material for the shell resin is higher than $1 \times 10^{6.5}$ Pa at this moment, outer films of resin particles formed of the shell resin are less likely to soften, and thus the resin particles are less susceptible to deformation. Meanwhile, once a laser is irradiated during fabrication, a material for the shell resin softens, melts, or disappears, thereby fusing the resin particles. From a viewpoint of facilitating softening, disappearing, and melting of the shell resin during laser irradiation, as well as promoting fusing of resin particles having a core-shell structure, and enabling shorter-time three-dimensional fabrication, it is preferable that a difference between a temperature at which a material for the shell resin softens, melts, or disappears and a temperature at which a material for the core resin softens and melts is small. Further, it is also preferable that the difference between the above temperatures is small from a viewpoint of decreasing a volume change due to an increased specific volume of the core resin by heating. Meanwhile, from a viewpoint of suppressing deformation of resin particles due to softening of a material for the shell resin at a standby temperature, it is also preferable that the difference between the above temperatures is not excessively small. The difference between the above temperatures can be estimated from a difference between a temperature $TS_{(6.5)}$ at which a storage modulus G' of a material for the shell resin becomes $1 \times 10^{6.5}$ Pa and a temperature $TC_{(6.5)}$ at which a storage modulus G' of a material for the core resin becomes $1 \times 10^{6.5}$ Pa. In view of the above, the difference between $TS_{(6.5)}$ and $TC_{(6.5)}$ is preferably 5° C. or more and 70° C. or less, more preferably 10° C. or more and 70° C. or less, further preferably 10° C. or more and 60° C. or less, still further preferably 30° C. or more and 60° C. or less.

The temperature $TC_{(6.5)}$ at which a storage modulus G' of a material for the core resin becomes $1 \times 10^{6.5}$ Pa is preferably within an adjustable temperature range of the core resin through preheating by a commonly known apparatus employed in powder bed fusion. In view of the above, $TC_{(6.5)}$ is preferably 50° C. or higher and 300° C. or lower, more preferably 100° C. or higher and 300° C. or lower, further preferably 100° C. or higher and 250° C. or lower, still further preferably 140° C. or higher and 250° C. or lower, and even still further preferably 140° C. or higher and 200° C. or lower.

Meanwhile, the temperature $TS_{(6.5)}$ at which a storage modulus G' of a material for the shell resin becomes $1 \times 10^{6.5}$ Pa is preferably within a temperature range that facilitates melting of a core resin by laser irradiation while ensuring freedom in selecting of a core resin. In view of the above, $TS_{(6.5)}$ is preferably 100° C. or higher and 350° C. or lower, more preferably 150° C. or higher and 350° C. or lower, further preferably 150° C. or higher and 330° C. or lower, still further preferably 250° C. or higher and 330° C. or lower, and even still further preferably 250° C. or higher and 300° C. or lower.

From a viewpoint of further suppressing deformation of an object after laser irradiation, the core resin preferably solidifies in a shorter time during cooling after laser irradiation. In view of the above, a temperature difference between a softening temperature of a material for the core resin (temperature $TC_{(6.5)}$ at which a storage modulus G' becomes $1 \times 10^{6.5}$ Pa) and a temperature at which a material for the core resin becomes hard to an extent without deformation (temperature at which a storage modulus G' becomes $1 \times 10^{7.0}$ Pa (hereinafter, also denoted as $TC_{(7.0)}$ in some cases)) is preferably small. Specifically, an absolute difference between $TC_{(7.0)}$ and $TC_{(6.5)}$ ($|TC_{(7.0)} - TC_{(6.5)}|$) is preferably 10° C. or more and 100° C. or less, more preferably 10° C. or more and 80° C. or less, further preferably 15° C. or more and 80° C. or less, still further preferably 20° C. or more and 80° C. or less, and even still further preferably 20° C. or more and 50° C. or less.

As for resin particles having a core-shell structure, in order to measure a temperature at which a storage modulus G' of the core resin becomes a specific numerical value, the resin particles having a core-shell structure may be measured for viscoelasticity characteristics according to above-described procedure without any change. Meanwhile, as for resin particles having a core-shell structure, in order to measure a temperature at which a storage modulus G' of the shell resin becomes a specific numerical value, the core component may be removed first, for example, by dissolving the resin particles in a solvent that only dissolves the core, and then the remaining shell resin may be measured for viscoelasticity characteristics according to the above-described procedure.

A core-shell structure herein means that an area ratio of the surface of a core particle, which is basically formed of a core resin, covered by a shell resin is 90% or higher. Practically, cross-sections of many resin particles are imaged using a transmission electron microscope (TEM), a ratio of a core particle surface covered by a shell resin is measured for randomly selected 10 core particles in the obtained image, and the resin particles are considered to have a core-shell structure when their average value is 90% or higher.

Figure 1B:
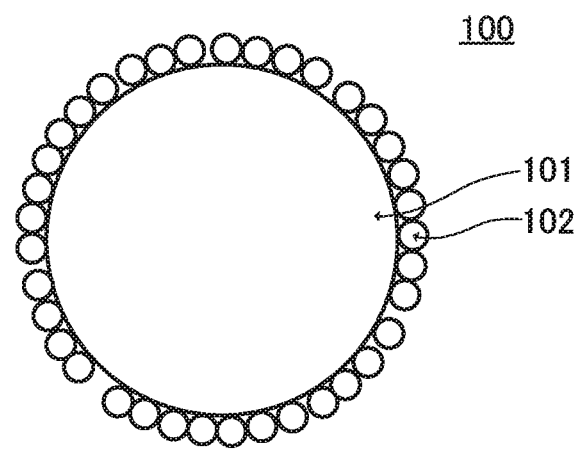
FIG. 1B is a schematic sectional view of a resin particle of another embodiment of the present invention.

A resin particle having a core-shell structure may be resin particle 100 composed of core particle 101 covered by sheet-like shell resin 102 as illustrated in FIG. 1A, which is a schematic sectional view of an embodiment of a resin particle having a core-shell structure, or may be resin particle 100 composed of core particle 101 covered by particle-like shell resin 102 as illustrated in FIG. 1B, which is a schematic sectional view of another embodiment.

An average particle size of the core resin is preferably 1 µm or larger and 200 µm or smaller. When the average particle size is 1 µm or larger, a powder material is easily handled during three-dimensional fabrication since such a powder material exhibits satisfactory flowability. In addition, when the average particle size is 1 µm or larger, the core resin is easily prepared without increasing manufacturing costs of such a powder material. Meanwhile, when the average particle size is 200 µm or smaller, fabrication of further highly accurate three-dimensional objects becomes possible. In view of the above, the average particle size of the core resin is preferably 2 µm or larger and 150 µm or smaller, more preferably 5 µm or larger and 100 µm or smaller, further preferably 5 µm or larger and 70 µm or smaller, and still further preferably 10 µm or larger and 60 µm or smaller. In the present specification, cross-sections of many resin particles are imaged using a TEM, the thickness of the shell resin is measured at 10 points for randomly selected 10 resin particles in the obtained image, and their average value is regarded as an average thickness of the shell resin.

When a particle-like shell resin covers a core resin, an average thickness of the shell resin is preferably smaller than an average particle size of the core resin, and more preferably equal to or less than the half of an average particle size of the core resin. Specifically, 2 µm or more and 75 µm or less is preferable. When the average particle size is 2 µm or more, aggregation of resin particles during preheating is readily suppressed. Meanwhile, when the average particle size is 75 µm or less, deformation of an object, such as curving, is readily suppressed. The average thickness of the shell resin is preferably 2 µm or more and 50 µm or less, more preferably 3 µm or more and 50 µm or less, and further preferably 5 µm or more and 30 µm or less.

An average particle size of particles herein refers to a volume-average particle size measured by a dynamic light scattering method. The volume-average particle size can be measured using a laser diffraction-type particle size analyzer equipped with a wet disperser (from Sympatec GmbH, HELOS).

The amounts of a core resin and a shell resin are not limited provided that the above-described resin particles having a core-shell structure are formed. For example, the amount of a shell resin is preferably 0.1 part by weight or more and 20 parts by weight or less, more preferably 0.5 part by weight or more and 20 parts by weight or less, further preferably 0.5 part by weight or more and 15 parts by weight or less, still further preferably 1 part by weight or more and 15 parts by weight or less, and even still further preferably 1 part by weight or more and 10 parts by weight or less, relative to 100 parts by weight of a core resin.

1-2. Other Materials 1-2-1. Laser Absorbers

The powder material may further contain a laser absorber from a viewpoint of more efficiently converting light energy of a laser into thermal energy. Such a laser absorber may be any material that absorbs a laser of a wavelength used and generates heat. Examples of such laser absorbers include carbon powders, nylon resin powders, pigments, and dyes. These laser absorbers may be used alone or in combinations of two types.

The amount of a laser absorber may be set appropriately within a range that facilitates fusing of resin particles having a core-shell structure, and may be more than 0% by mass and less than 3% by mass, based on the total mass of the powder material, for example.

1-2-2. Flow Agents

From a viewpoint of enhancing flowability of the powder material and facilitating handling of the powder material during three-dimensional fabrication, the powder material may further contain a flow agent. The flow agent may be any self-lubricating material with a low friction coefficient. Examples of such flow agents include silicon dioxide and boron nitride. The flow agent may be used alone or in combinations of two types.

The amount of a flow agent may be set appropriately provided that flowability of the powder material is enhanced and resin particles having a core-shell structure are fused satisfactorily, and may be more than 0% by mass and less than 2% by mass, based on the total mass of the powder material, for example.

2. Manufacturing Method for Powder Materials

The embodiment relates to a manufacturing method for the powder material. Resin particles having a core-shell structure can be used as the powder material without additional processing. When the powder material contains the above-mentioned other materials, the powder material may be obtained by stirring/mixing powders of the other materials with resin particles having a core-shell structure.

2-1. Manufacturing Method for Resin Particles of Present Invention

Resin particles of the present invention can be manufactured according to a commonly known method of manufacturing particles having a core-shell structure using resin materials.

Examples of such methods include a wet coating process using a coating solution of a shell resin, a dry coating process in which a core resin and a shell resin are stirred/mixed so as to be bonded with each other by mechanical impacting, and combinations thereof. When the wet coating process is employed, the coating solution may be applied on the surface of a core resin by spray coating, or a core resin may be immersed in the coating solution. According to the dry coating process, a resin particle composed of a core particle covered by particle-like shell resin is obtained as illustrated in FIG. 1B. According to the wet coating process, a resin particle composed of a core particle covered by a sheet-like shell resin is obtained as illustrated in FIG. 1A. The wet coating process readily forms a shell layer having a uniform thickness, whereas the dry coating process can simplify manufacturing processes by eliminating a drying step.

A core resin and a shell resin are selected so that a temperature $TS_{(6.5)}$ at which a storage modulus G' of a material for the shell resin becomes $1 \times 10^{6.5}$ Pa is higher than a temperature $TC_{(6.5)}$ at which a storage modulus G' of a material for the core resin becomes $1 \times 10^{6.5}$ Pa. Such a core resin and a shell resin may be commercially available ones, or either or both of the resins may be synthesized using an appropriate monomer and/or a prepolymer, for example.

When commercial resins are used, commercial materials may be combined so that storage moduli G' measured according to the above-described method satisfy the above relationship. The above-described relationship can be predicted to be satisfied when a material having a lower temperature at which a storage modulus G' becomes $1 \times 10^{8.0}$ Pa (glass transition temperature (Tg)) is selected as a core resin, and a material having a higher Tg is selected as a shell resin. For example, the above relationship is satisfied when polyethylene, polypropylene, or polystyrene, which tends to have a lower Tg, is selected as a core resin, and a polyether ether ketone (PEEK), a polycarbonate, or an acrylic polymer, which tends to have a higher Tg, is selected as a shell resin. In many cases, Tg of each commercial resin is reported from respective manufacturers.

When a resin is manufactured, a storage modulus G' of the resin to be manufactured can be controlled within a desired range by changing an average molecular weight of the resin. Specifically, a storage modulus G' of the resin becomes higher as an average molecular weight of the resin to be manufactured becomes larger, whereas a storage modulus G' of the resin becomes lower as an average molecular weight of the resin to be manufactured becomes smaller. A relationship between a molecular weight and a temperature at which a storage modulus G' becomes $1 \times 10^{6.5}$ Pa is investigated in advance for each resin to be used, and a molecular weight of the resin to be manufactured may be determined with reference to such a relationship during the subsequent manufacture of the resin.

3. Method of Fabricating Three-Dimensional Objects

The embodiment relates to a method of fabricating a three-dimensional object using the above-described powder materials. The method of the embodiment can be performed similarly to common powder bed fusion except for using the above-described powder materials. Specifically, the method of the embodiment includes steps of (1) forming a thin layer of the powder material, (2) preheating the formed thin layer of the powder material, (3) forming an object layer by selectively irradiating the preheated thin layer with a laser beam to fuse resin particles contained in the powder material, and (4) laminating a plurality of the object layers by repeating steps 1 to 3 in this order a plurality of times. One of object layers constituting a three-dimensional object is formed in step 3, and a final three-dimensional object is manufactured by further repeating steps 1 to 3 in step 4 so as to laminate subsequent layers of the three-dimensional object.

3-1. Step of Forming Thin Layer of Powder Material (Step 1)

In this step, a thin layer of the powder material is formed. For example, the powder material supplied from a powder supply section is spread evenly on a build stage by a recoater. The thin layer may be formed directly on a build stage, or may be formed on an already spread powder material or on an already formed object layer.

The thickness of the thin layer is set to be the same as the thickness of an object layer. Although the thickness of the thin layer may optionally be set corresponding to the accuracy of a three-dimensional object to be fabricated, it is typically 0.01 mm or more and 0.30 mm or less. By setting the thickness of the thin layer to 0.01 mm or more, fusing of resin particles in an underneath layer can be prevented during laser irradiation for forming a subsequent layer. By setting the thickness of the thin layer to 0.30 mm or less, resin particles contained in a powder material, which forms the thin layer, can be fused satisfactorily over the entire thickness direction by transferring laser energy to a lower portion of the thin layer. In view of the above, the thickness of the thin layer is more preferably 0.01 mm or more and 0.10 mm or less. Further, from a viewpoint of satisfactorily fusing resin particles over the entire thickness direction of the thin layer and suppressing cracking between laminated layers, the thickness of the thin layer is preferably set so that a difference between the thickness of the thin layer and a beam spot diameter of a laser described hereinafter becomes 0.10 mm or less.

3-2. Step of Preheating Formed Thin Layer of Powder Material (Step 2)

In this step, the formed thin layer of the powder material is preheated. From a viewpoint of decreasing lowering in fabrication accuracy due to distortion of an object layer through re-dissolution thereof by heat of the preheated powder material, a difference between a surface temperature of the preheated thin layer and the above-mentioned standby temperature (temperature at which a storage modulus G' of a material for the core resin becomes $1 \times 10^{6.5}$ Pa) is preferably 5° C. or more and 50° C. or less, and more preferably 5° C. or more and 30° C. or less.

3-3. Step of Forming Object Layer through Fusing of Resin Particles Having Core-Shell Structure (Step 3)

In this step, the preheated thin layer, in positions where an object layer is to be formed, is selectively irradiated with a laser to fuse resin particles in the irradiated positions. Fused resin particles melt together with adjacent powders to form a fused body, thereby forming an object layer. In this step, resin particles that have received laser energy are fused with a resin material in an already formed layer, and consequently adhesion between adjacent layers also results.

The wavelength of a laser may be set within a range that is absorbed by a material for the shell resin. A difference between the wavelength of a laser and a wavelength at which a material for the shell resin has the highest absorptance is preferably set to be small. Since resins can absorb light in various wavelength regions, however, a laser with a wide wavelength band, such as a $CO_2$ laser, is preferably used. For example, the wavelength of a laser is preferably 0.8 μm or longer and 12 μm or shorter.

Output conditions of a laser may be set so that a storage modulus G' of a material for the core resin becomes $1 \times 10^{4.0}$ Pa or higher and lower than $1 \times 10^{8.0}$ Pa.

The output power of a laser may be set within a range in which a material for the shell resin is satisfactorily fused at a scanning speed of a laser described hereinafter. Specifically, the output power may be 5.0 W or higher and 60 W or lower. From a viewpoint of lowering laser energy, decreasing fabrication costs, and simplifying the configuration of a fabrication apparatus, the output power of a laser is preferably 30 W or lower, and more preferably 20 W or lower.

A scanning speed of a laser may be set within a range without increasing fabrication costs or requiring an excessively complex apparatus configuration. Specifically, the scanning speed is preferably 1 mm/s or faster and 100 mm/s or slower, more preferably 1 mm/s or faster and 80 mm/s or slower, further preferably 2 mm/s or faster and 80 mm/s or slower, still further preferably 3 mm/s or faster and 80 mm/s or slower, and even still further preferably 3 mm/s or faster and 50 mm/s or slower.

The beam diameter of a laser can be set appropriately corresponding to the accuracy of three-dimensional objects to be fabricated.

3-4. Additional Note

At least step 3 is preferably performed under a reduced pressure or an inert gas atmosphere from a viewpoint of preventing lowering in strength of a three-dimensional object due to, for example, oxidation of resin particles during fusing. The reduced pressure is preferably $1 \times 10^{-2}$ Pa or lower, and more preferably $1 \times 10^{-3}$ Pa or lower. Examples of the inert gases that can be used in the embodiment include nitrogen gas and a noble gas. Among these inert gases, nitrogen ($N_2$) gas, helium (He) gas, or argon (Ar) gas is preferable due to its availability. From a viewpoint of simplifying the fabrication processes, all steps 1 to 3 are preferably performed under a reduced pressure or an inert gas atmosphere.

4. Three-Dimensional Fabrication Apparatus

Figure 2:
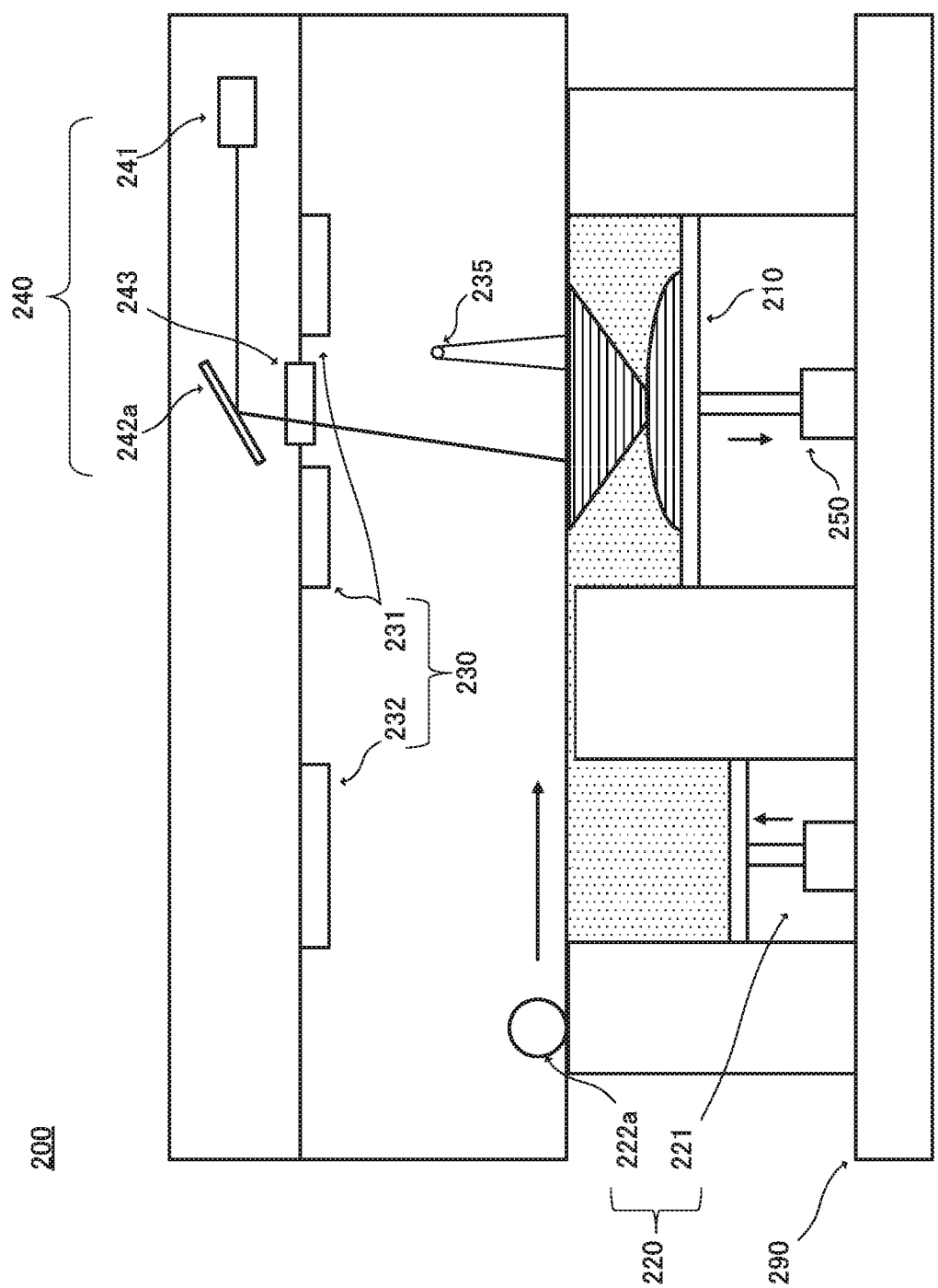
FIG. 2 is a schematic side view of the configuration of a three-dimensional fabrication apparatus of the embodiment.

The embodiment relates to an apparatus for fabricating a three-dimensional object using the above-described powder materials. The apparatus of the embodiment can be configured similarly to a commonly known apparatus for fabricating a three-dimensional object by powder bed fusion except for using the above-described powder materials. Specifically, three-dimensional fabrication apparatus 200 of the embodiment includes: as illustrated in FIG. 2 that is a schematic side view of a configuration thereof, build stage 210 located inside an opening; thin layer forming section 220 that forms, on the build stage, a thin layer of a powder material containing resin particles having a core-shell structure; preheating section 230 that preheats the thin layer formed on the build stage; laser irradiation section 240 that irradiates the thin layer with a laser to form an object layer through fusing of the resin particles; stage support section 250 that supports build stage 210 such that a position thereof in the vertical direction is changed; and base 290 that supports each of the above sections.

Figure 3:
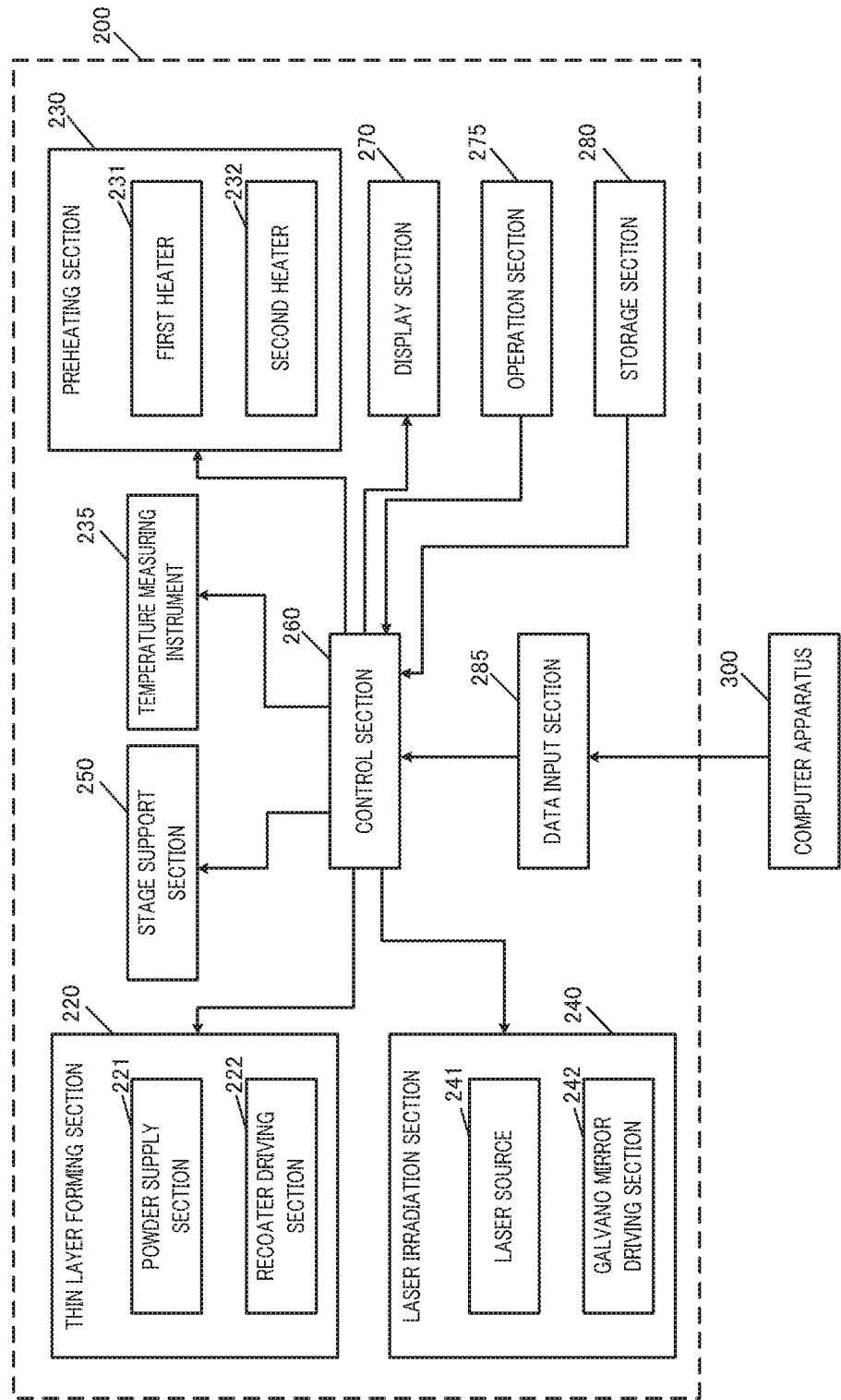
FIG. 3 illustrates the main part of a control system of the three-dimensional fabrication apparatus of the embodiment.

As shown in FIG. 3 that illustrates a main part of the control system, three-dimensional fabrication apparatus 200 may include: control section 260 that controls thin layer forming section 220, preheating section 230, laser irradiation section 240, and stage support section 250 such that an object layer is repeatedly formed and laminated; display section 270 for showing various information; operation section 275 including a pointing device and the like for receiving instructions from a user; storage section 280 that stores various information, such as a control program executed by control section 260; and data input section 285 including an interface and the like for transmitting/receiving various information, such as three-dimensional fabrication data, to/from an external apparatus. The three-dimensional fabrication apparatus may further include temperature measuring instrument 235 that measures a temperature in a region where an object layer is to be formed on the surface of the thin layer formed on build stage 210. Computer apparatus 300 for creating three-dimensional fabrication data may be connected with three-dimensional fabrication apparatus 200.

A three-dimensional object is fabricated on build stage 210 by forming a thin layer by thin layer forming section 220, preheating the thin layer by preheating section 230, and irradiating the thin layer with a laser by laser irradiation section 240 to form an object layer, and laminating such object layers.

Thin layer forming section 220 may include, for example, powder supply section 221 having an opening, whose edge portion is substantially on the same plane in the horizontal direction as the edge portion of an opening where build stage 210 is elevated/lowered, a powder material reservoir section that extends downward in the vertical direction in the opening, and a supply piston that is elevated/lowered inside the opening in the bottom portion of the powder reservoir section; and recoater 222a that spreads supplied powder material evenly on build stage 210 to form a thin layer of the powder material.

Alternatively, powder supply section 221 may include a powder reservoir section provided above build stage 210 in the vertical direction and a nozzle such that a powder material is discharged onto the same plane in the horizontal direction as the build stage.

Preheating section 230 may have any configuration that can heat a region where an object layer is to be formed on the surface of the thin layer and maintain its temperature. For example, preheating section 230 may include first heater 231 that can heat the surface of a thin layer formed on build stage 210, or further include second heater 232 that heats a powder material before being supplied to the build stage. Further, preheating section 230 may be configured to selectively heat a region where the above-mentioned object layer is to be formed, or may be configured to heat inside the whole apparatus in advance and then adjust the surface of the thin layer to a predetermined temperature.

Temperature measuring instrument 235 may be any instrument that enables noncontact measurement of a surface temperature in a region where the object layer is to be formed, and may be an IR sensor or an optical pyrometer, for example.

Laser irradiation section 240 includes laser source 241 and galvano mirror 242a. Laser irradiation section 240 may further include laser window 243 that allows transmission of a laser and a lens (not shown) for setting the focal length of the laser on the surface of a thin layer. Laser source 241 may be any light source that emits a laser of the above-mentioned wavelength at the above-mentioned output. Examples of laser sources 241 include a YAG laser source, a fiber laser source, and a $CO_2$ laser source. Galvano mirror 242a may be composed of an X mirror and a Y mirror for reflecting a laser emitted from laser source 241 and scanning X and Y directions with the laser, respectively. Laser window 243 may be formed of any material that allows transmission of a laser.

Stage support section 250 supports build stage 210 such that a position thereof in the vertical direction is changed. In other words, build stage 210 is configured to be moved accurately in the vertical direction by stage support section 250. Various configurations of stage support section 250 may be employed. For example, stage support section 250 may be composed of a holding member that holds build stage 210, a guide member that guides the holding member in the vertical direction, and a ball screw that engages with a screw hole provided in the guide member.

Control section 260 includes a hardware processor, such as a central processing unit, and controls operations of the entire three-dimensional fabrication apparatus 200 during fabrication operations for three-dimensional objects.

Control section 260 may be configured, for example, to convert three-dimensional fabrication data acquired by data input section 285 from computer apparatus 300 into a plurality of slice data that is thinly sliced in the lamination direction of object layers. The slice data is fabrication data of each object layer for fabricating a three-dimensional object. The thickness of the slice data, i.e., the thickness of the object layer, agrees with a distance corresponding to the thickness of one object layer (lamination pitch).

Display section 270 may be a liquid crystal display or monitor, for example.

Operation section 275 may include a pointing device, such as a keyboard or a mouse, and may be equipped with various operation keys, such as a numerical keypad, an execution key, and a start key.

Storage section 280 may include various storage media, such as ROM, RAM, a magnetic disk, a HDD, and a SSD.

Three-dimensional fabrication apparatus 200 may include a pressure-reducing section (not shown), such as a pressure-reducing pump, that reduces pressure inside the apparatus under control of control section 260, or an inert gas supply section (not shown) that supplies an inert gas inside the apparatus under control of control section 260.

4-1. Three-Dimensional Fabrication Using Three-Dimensional Fabrication Apparatus 200

Control section 260 converts three-dimensional fabrication data acquired by data input section 285 from computer apparatus 300 into a plurality of slice data that is thinly sliced in the lamination direction of object layers. Control section 260 then controls the operations below of three-dimensional fabrication apparatus 200.

Powder supply section 221 drives a motor and a driving mechanism (neither shown) according to supply information, which is output from control section 260, to move a supply piston upward in the vertical direction (arrow direction in FIG. 2), and thus push a powder material on the same plane in the horizontal direction as the build stage.

Subsequently, recoater driving section 222 moves recoater 222a in the horizontal direction (arrow direction in FIG. 2) according to thin layer formation information, which is output from control section 260, to transfer the powder material onto build stage 210 while pressing the powder material such that the thickness of its thin layer corresponds to the thickness of one object layer.

Preheating section 230 heats, according to temperature information output from control section 260, the surface of a thin layer formed or inside the entire apparatus. The temperature information may be information for heating the surface of the thin layer to a temperature that is retrieved by control section 260 from storage section 280, based on data (input from data input section 285) on a temperature $TC_{(6.5)}$ at which a storage modulus G' of a material for the core resin becomes $1\times10^{6.5}$ Pa, such that a difference from the temperature $TC_{(6.5)}$ is 5° C. or more and 50° C. or less. Preheating section 230 may start heating after a thin layer is formed, or may heat a location corresponding to the surface of a thin layer to be formed or inside the apparatus before a thin layer is formed.

Subsequently, according to laser irradiation information output from control section 260, laser irradiation section 240 emits a laser from laser source 241 to a region of each slice data on a thin layer where a three-dimensional object is to be formed, and drives galvano mirror 242a by galvano mirror driving section 242 to scan with the laser. Through laser irradiation, resin particles contained in the powder material are fused to form an object layer.

Afterwards, stage support section 250 drives a motor and a driving mechanism (neither shown) according to position control information, which is output from control section 260, to move build stage 210 downward in the vertical direction (arrow direction in FIG. 2) by a lamination pitch.

Display section 270 shows, as needed, various information and/or messages to be recognized by a user under control of control section 260. Operation section 275 receives various input operations by a user and outputs operation signals corresponding to the input operations to control section 260. For example, a virtual three-dimensional object to be formed may be shown in display section 270 to confirm whether a desired shape is formed, and corrections may be added from operation section 275 if a desired shape is not formed.

Control section 260 stores data in storage section 280 or retrieves data from storage section 120 as needed.

Control section 260 may receive, from temperature measuring instrument 235, temperature information on a region where an object layer is to be formed on the surface of a thin layer, and control heating by preheating section 230 such that a difference between a temperature in the region where an object layer is to be formed and the temperature $TC_{(6.5)}$ at which a storage modulus G' of a material for the core resin becomes $1\times10^{6.5}$ Pa is 5° C. or more and 50° C. or less, and preferably 5° C. or more and 30° C. or less.

By repeating these operations, object layers are laminated, thereby fabricating a three-dimensional object.

EXAMPLES

Hereinafter, specific Examples of the present invention will be described. These Examples, however, shall not be construed as limiting the technical scope of the present invention.

1. Preparation of Powder Materials

Resins shown in Table 1 were prepared as materials for a core resin and a shell resin. Specifically, CALIBRE 301-4 (from Sumika Styron Polycarbonate Limited) was used as No. 1, 2, and 12 polycarbonate, PM 970W (from Sunallomer Ltd.) was used as No. 3 polypropylene, GR-2000 (from Denka Company Limited) was used as No. 4 ABS, Amilan CM 1001 (from Toray Industries, Inc.) was used as No. 5 nylon 6, F 022NH (from Ube-Maruzen Polyethylene Co., Ltd.) was used for No. 6 polyethylene, FMS-783 (from Japan U-Pica Company Ltd.) was used as No. 7 crystalline polyester, SD POLYCA 878-20 (from Sumika Styron Polycarbonate Limited) was used as No. 8 polycarbonate, PCZ-200 (from Mitsubishi Gas Chemical Company, Inc.) was used as No. 9 soluble polycarbonate, and Iupiace LN 91 (from Mitsubishi Chemical Corporation) was used as No. 11 polyphenylene ether. As No. 10 resin, a polyarylate synthesized according to the procedure described in Japanese Patent Application Laid-Open No. 9-136946 was used. When the average particle size of a commercial resin was larger than the numerical value shown in Table 1, resin particles were pulverized by a mechanical pulverization process so that the average particle size measured with a laser diffraction-type particle size analyzer equipped with a wet disperser (from Sympatec GmbH, HELOS) became the value shown in Table 1.

In Table 1, the numerical values in the column of "average particle size" each represent the particle size (unit: μm) of the respective resins, the numerical values in the column of "TC(65)" each represent a temperature at which a storage modulus G' becomes $1\times10^{6.5}$ Pa, the numerical values in the column of "TC(70)" each represent a temperature at which a storage modulus G' becomes $1\times10^{7.0}$ Pa, and the numerical value ranges in the column of "TC(40-60)" each represent a temperature range in which a storage modulus G' becomes $1\times10^{4.0}$ Pa or higher and $1\times10^{6.0}$ Pa or lower.

TC(65), TC(70), and TC(40-60) in Table 1 are values obtained by measuring according to the following method using a storage modulus measuring apparatus (from TA Instruments, ARES-G2 rheometer).

(Preparation of Samples)

A powder material was pressed at ambient temperature and at 30 kN for 1 minute using a press (from NPa System Co., Ltd., NT-100H) to yield a columnar sample with a diameter of about 8 mm and a height of about 2 mm.

(Measurement Procedure)

The prepared columnar sample was heat-melted, and then attached to parallel plates of the press, whose temperatures had been adjusted to 150° C., under load in the vertical direction without exceeding an axial force of 10 gw. Under such a state, the parallel plates and the columnar sample were heated to a measurement start temperature of 250° C., and viscoelasticity data was measured while the parallel plates and the columnar sample were cooled gradually. The measured data was forwarded to a computer in which Windows 7 is installed (from Microsoft Corporation), and a storage modulus G' (Pa) value at each temperature was read through control, data collection, and analysis software (TRIOS) that operates on the computer.

(Measurement Conditions)

Measurement frequency: 6.28 rad/s

Setting of measurement strain: set to initial value of 0.1% and measured in an automatic measurement mode Elongation correction of sample: adjusted in an automatic measurement mode Measurement temperature: gradual cooling from 250° C. to 100° C. at 5° C./min Measurement interval: viscoelasticity data measured every 1° C.

that for powder material 1 except for changing the core resin from resin 1 to resin 2 and 3, respectively, powder material 5 was prepared in a similar procedure to that for powder material 1 except for changing the core resin from resin 1 to resin 3 and the shell resin from resin 8 to resin 10, powder material 6 was prepared in a similar procedure to that for powder material 1 except for changing the core resin from resin 1 to resin 4 and the shell resin from resin 8 to resin 10, powder material 7 was prepared in a similar procedure to that for powder material 1 except for changing the core resin from resin 1 to resin 5 and the shell resin from resin 8 to resin 10, powder material 8 was prepared in a similar procedure to that for powder material 1 except for changing the core resin from resin 1 to resin 6 and the shell resin from resin 8 to resin 11, powder material 9 was prepared in a similar procedure to that for powder material 1 except for changing the core resin from resin 1 to resin 7 and the shell resin from resin 8 to resin 11, and powder material 11 was prepared in a similar procedure to that for powder material 1 except for changing the shell resin from resin 8 to resin 12.

1-3. Powder Material 3

Polymer dispersion 1 was obtained by dissolving 1 part by weight of resin 9 and 2 parts by weight of an emulsifier (from Sakamoto Yakuhin Kogyo Co., Ltd., CRS-75) in 100 parts by weight of toluene, and further dispersing 10 parts by weight of resin 1. Polymer dispersion 1 was fed into a solution of 10 parts by weight of a nonionic surfactant (from Kao Corporation, Emanon C-25 ("Emanon" is a registered trade mark of the firm)) dissolved in 200 parts by weight of water, and ultrasonication was performed for 10 minutes to yield resin dispersion 2. Resin dispersion 2 was fed into an evaporator, and toluene was removed under a reduced pressure to yield a resin dispersion. The resulting resin dispersion was then filtered under a reduced pressure to yield powder material 3.

TABLE 1

Resins

| No. | Material | Average particle size (μm) | TC(65) (° C.) | TC(70) (° C.) | TC(40-60) (° C.-° C.) | Manufacturer, Trade name |
|---|---|---|---|---|---|---|
| 1 | Polycarbonate | 50 | 160 | 155 | 140-230 | Sumika Styron Polycarbonate Limited, CALIBRE 301-4 |
| 2 | Polycarbonate | 150 | 160 | 155 | 140-230 | Sumika Styron Polycarbonate Limited, CALIBRE 301-4 |
| 3 | Polypropylene | 50 | 120 | 100 | 90-140 | Sunallomer Ltd., PM 970W |
| 4 | ABS | 50 | 120 | 115 | 100-270 | Denka Company Limited, ABS GR-2000 |
| 5 | Nylon 6 | 50 | 220 | 210 | 40-230 | Toray Industries, Inc., Amilan CM 1001 |
| 6 | Polyethylene | 50 | 100 | 90 | 60-140 | Ube Industries, Ltd., Polyethylene F 022NH |
| 7 | Crystalline polyester | 50 | 130 | 120 | 90-160 | Japan U-Pica Company Ltd., FMS-783 |
| 8 | Polycarbonate | 5 | 180 | 170 | 155-250 | Sumika Styron Polycarbonate Limited, SD POLYCA 878-20 |
| 9 | Soluble polycarbonate | — | 180 | 170 | 155-250 | Mitsubishi Gas Chemical Company, Inc., PCZ-200 |
| 10 | Polyarylate | 5 | 240 | 230 | 210-340 | Synthesized according to procedure described in Japanese Patent Application Laid-Open No. 9-136946 |
| 11 | Polyphenylene ether | 5 | 240 | 230 | 210-300 | Mitsubishi Chemical Corporation, Iupiace LN 91 |
| 12 | polycarbonate | 5 | 160 | 155 | 140-230 | Sumika Styron Polycarbonate Limited, CALIBRE 301-4 |

1-1. Powder Material 1

Into a hybridizer (Nara Machinery Co., Ltd., Hybridization System (NHS)), 100 parts by weight of resin 1 mixed with 5 parts by weight of resin 8 was fed, and stirred and mixed at 16,000 rpm for 10 minutes to yield powder material 1.

1-2. Powder Materials 2, 4 to 9, and 11

Powder materials 2, 4 to 9, and 11 were obtained in a similar manner to that for powder material 1 except for combining resins as shown in Table 2. Specifically, powder materials 2 and 4 were prepared in a similar procedure to 1-4. Powder Material 10

Resin 1 was used as powder material 10 without further processing.

2. Measurement of Coverage

Resin particles were dispersed in a photocurable resin (from JEOL Ltd., D-800) and then photocured to form a block. From the block, a 100 to 200 nm-thick thin sample was cut using a microtome equipped with a diamond blade and mounted on a support film-attached grid for transmission electron microscope observation. The grid was placed in a scanning transmission electron microscope (from JEOL Ltd., JSM-7401F), and a bright-field image was taken under the following conditions.

(Imaging Method)
Accelerating voltage: 30 kV
Magnification: 10,000×

For each powder material, cross-sections of many resin particles were imaged using a TEM, an interface between a core resin and a shell resin was confirmed for randomly selected 10 resin particles in the obtained image, the thickness of the shell resin was measured for each resin particle, and their average value was obtained as an average thickness of the shell resin. In addition, a ratio of a portion covered by the shell resin in the surface of the core resin was measured, and their average was obtained as a coverage of each powder material.

Table 2 shows materials used for preparation of powder materials 1 to 11 and their coverages. In Tables 2, the numerical value ranges in the column of "TC(40-60)" each represent a temperature range in which a storage modulus G' becomes $1 \times 10^{4.0}$ Pa or higher and $1 \times 10^{6.0}$ Pa or lower. Further, in Table 2, the numerical values in the column of "TC(70)-TC(65)" are each absolute values obtained by subtracting TC(65) of the core resin from TC(70) of the core resin, and the numerical values in the column of "TS(65)-TC(65)" are each absolute values obtained by subtracting TC(65) of the core resin from TS(65) of the shell resin.

4. Evaluation of Objects

For each object 1 to 11, dimensions in the longitudinal direction and transverse direction were measured with a digital caliper (from Mitutoyo Corporation, Super Caliper CD 67-S PS/PM, "Super Caliper" is a registered trade mark of the firm). The differences between the dimensions to be fabricated (15 mm×20 mm) and the measured longitudinal and transverse dimensions were averaged as deviation in fabrication accuracy.

Table 3 shows powder materials used for fabrication of objects 1 to 11, fabrication conditions (preheating temperature and heating temperature during laser irradiation), and deviation in fabrication accuracy.

TABLE 3

Powder materials, Fabrication conditions, and Results

| Object No. | Powder material No. | TC(65) (° C.) | Preheating temperature (° C.) | Heating temperature during laser irradiation (° C.) | Result Deviation in fabrication accuracy (mm) |
|---|---|---|---|---|---|
| 1 | 1 | 160 | 170 | 250 | 0.1 |
| 2 | 2 | 160 | 170 | 250 | 0.2 |
| 3 | 3 | 160 | 170 | 250 | 0.1 |
| 4 | 4 | 120 | 170 | 250 | 0.1 |
| 5 | 5 | 120 | 230 | 340 | 0.1 |
| 6 | 6 | 120 | 230 | 340 | 0.1 |
| 7 | 7 | 220 | 230 | 340 | 0.1 |
| 8 | 8 | 100 | 230 | 300 | 0.1 |
| 9 | 9 | 130 | 230 | 300 | 0.1 |
| 10 | 10 | 160 | 150 | 250 | 1.0 |
| 11 | 11 | 160 | 150 | 230 | 1.0 |

TABLE 2

Powder Materials 1 to 11

| Powder material No. | Core resin | | | | | Shell resin | | | | Coverage (%) |
|---|---|---|---|---|---|---|---|---|---|---|
| | Resin No. | Average particle size (μm) | TC(65) (° C.) | TC(70) (° C.) | TC(40-60) (° C.) | TC(70)-TC(65) (° C.) | Resin No. | Average thickness (μm) | TS(65) (° C.) | TS-TC(65) (° C.) | |

| Powder material No. | Resin No. | Average particle size (μm) | TC(65) (° C.) | TC(70) (° C.) | TC(40-60) (° C.) | TC(70)-TC(65) (° C.) | Resin No. | Average thickness (μm) | TS(65) (° C.) | TS-TC(65) (° C.) | Coverage (%) |
|---|---|---|---|---|---|---|---|---|---|---|---|
| 1 | 1 | 50 | 160 | 155 | 140-230 | 5 | 8 | 5 | 180 | 20 | 97 |
| 2 | 2 | 150 | 160 | 155 | 140-230 | 5 | 8 | 5 | 180 | 20 | 99 |
| 3 | 1 | 50 | 160 | 155 | 140-230 | 5 | 9 | — | 180 | 20 | 100 |
| 4 | 3 | 50 | 120 | 100 | 70-140 | 20 | 8 | 5 | 180 | 40 | 98 |
| 5 | 3 | 50 | 120 | 100 | 70-140 | 20 | 10 | 5 | 240 | 100 | 96 |
| 6 | 4 | 50 | 120 | 115 | 100-270 | 5 | 10 | 5 | 240 | 120 | 99 |
| 7 | 5 | 50 | 220 | 210 | 40-230 | 10 | 10 | 5 | 240 | 20 | 94 |
| 8 | 6 | 50 | 100 | 90 | 60-140 | 10 | 11 | 5 | 240 | 140 | 99 |
| 9 | 7 | 50 | 130 | 120 | 90-160 | 10 | 11 | 5 | 240 | 110 | 97 |
| 10 | 1 | 50 | 160 | 155 | 140-230 | 5 | — | — | — | — | 0 |
| 11 | 1 | 50 | 160 | 155 | 140-230 | 5 | 12 | 5 | 160 | 0 | 97 |

3. Fabrication of Objects

Powder materials 1 to 11 were each spread on a build stage, which was placed inside a large electric furnace, to form a 0.1 mm-thick thin layer, and heated to a preheating temperature shown in Table 3 by adjusting the temperature of the electric furnace. Under the following conditions, a 15 mm×20 mm range of the thin layer was irradiated with a laser from a 50 W fiber laser (from SPI Lasers Limited) equipped with a galvanometer scanner for YAG wavelengths to form an object layer. By repeating the above process 10 times, objects 1 to 11 composed of laminated 10 layers were each fabricated.

[Laser Emission Conditions]
Laser output: 20 W
Laser wavelength: 1.07 μm
Beam diameter: 170 μm on thin layer surface
[Laser Scanning Conditions]
Scanning speed: 3.0 mm/s
Scanning interval: 0.2 mm
[Surrounding Atmosphere]
Temperature: ambient temperature
Gas: argon (Ar) 100%

Fabrication accuracy was enhanced when an object was fabricated from a powder material (powder material 1 to 9) in which powder particles each including a core resin and a shell resin covering the core resin, and a temperature at which a storage modulus G' of a material for the shell resin becomes $1 \times 10^{6.5}$ Pa is higher than a temperature at which a storage modulus G' of a material for the core resin becomes $1 \times 10^{6.5}$ Pa.

In particular, when an object was fabricated from a powder material (powder material 1, 3 to 9) in which an average particle size of a material for the core resin is 20 μm or larger and 70 μm or smaller, fabrication accuracy was enhanced further.

Meanwhile, when a powder material (powder material 10) formed of powder particles without core-shell structure, or a powder material (powder material 11) in which a temperature at which a storage modulus G' of a material for the shell resin becomes $1 \times 10^{6.5}$ Pa is comparable to a temperature at which a storage modulus G' of a material for the core resin becomes $1 \times 10^{6.5}$ Pa, fabrication accuracy was lowered further.

This application is entitled to and claims the benefit of Japanese Patent Application No. 2015-233081, filed on Nov. 30, 2015, the disclosure of which including the claims, specification, and drawings is incorporated herein by reference in its entirety.

INDUSTRIAL APPLICABILITY

According to the method and the apparatus of the present invention, further highly accurate fabrication becomes possible by powder bed fusion. Therefore, the present invention is believed to contribute to further widespread use of powder bed fusion.

REFERENCE SIGNS LIST

100 Resin particle
101 Core particle
102 Shell resin
200 Three-dimensional fabrication apparatus
210 Build stage
220 Thin layer forming section
221 Powder supply section
222 Recoater driving section
222a Recoater
230 Preheating section
231 First heater
232 Second heater
235 Temperature measuring instrument
240 Laser irradiation section
241 Laser source
242 Galvano mirror driving section
242a Galvano mirror
243 Laser window
250 Stage support section
260 Control section
270 Display section
275 Operation section
280 Storage section
290 Base
285 Data input section
300 Computer apparatus

The invention claimed is:

1. A powder material used for fabrication of a three-dimensional object by selectively irradiating a thin layer of a powder material containing powder particles with a laser beam to form an object layer through fusing of the powder particles, and laminating the object layer, wherein:
the powder particles each include a core resin and a shell resin that covers the core resin;
a temperature $TS_{(6.5)}$ at which a storage modulus G' of a material for the shell resin becomes $1 \times 10^{6.5}$ Pa is higher than a temperature $TS_{(6.5)}$ at which a storage modulus G' of a material for the core resin becomes $1 \times 10^{6.5}$ Pa, and
a difference between the temperature $TS_{(6.5)}$ and temperature $TS_{(6.5)}$ is 30° C. or more and 60° C. or less.

2. The powder material according to claim 1, wherein the temperature $TS_{(6.5)}$ at which a storage modulus G' of a material for the core resin becomes $1 \times 10^{6.5}$ Pa is 50° C. or higher and 300° C. or lower.

3. The powder material according to claim 1, wherein the temperature $TS_{(6.5)}$ at which a storage modulus G' of a material for the shell resin becomes $1 \times 10^{6.5}$ Pa is 100° C. or higher and 350° C. or lower.

4. The powder material according to claim 1, wherein the core resin is formed of a material having a difference between a temperature $TC_{(7.0)}$ at which a storage modulus G' becomes $1 \times 10^{7.0}$ Pa and a temperature $TS_{(6.5)}$ at which a storage modulus G' becomes $1 \times 10^{6.5}$ Pa is 10° C. or more and 100° C. or less.

5. The powder material according to claim 1, wherein an average particle size of the core resin is 1 μm or larger and 200 μm or smaller.

6. The powder material according to claim 1, wherein an amount of the shell resin in the powder particle is 0.1 part by weight or more and 20 parts by weight or less, relative to 100 parts by weight of the core resin.

7. A method of fabricating a three-dimensional object, comprising:
forming a thin layer of the powder material containing the powder particles according to claim 1;
preheating the formed thin layer of the powder material;
forming an object layer by selectively irradiating the preheated thin layer with a laser beam to fuse the powder particles contained in the powder material; and
laminating a plurality of the object layers by repeating the forming of the thin layer, the preheating, and the forming of the object layer in this order a plurality of times.

8. The method according to claim 7, wherein in the preheating, the thin layer is heated to a temperature at which a difference between a surface temperature of the thin layer and the temperature $TS_{(6.5)}$ at which a storage modulus G' of a material for the core resin becomes $1 \times 10^{6.5}$ Pa is 5° C. or more and 50° C. or less.

9. The method according to claim 7, wherein in the forming of the object layer, the thin layer is selectively irradiated with the laser beam such that a storage modulus G' of a material for the core resin becomes $1 \times 10^{4.0}$ Pa or higher and $1 \times 10^{6.0}$ Pa or lower.

* * * * *